United States Patent
Bakshi et al.

(10) Patent No.: US 10,506,068 B2
(45) Date of Patent: Dec. 10, 2019

(54) CLOUD-BASED CROSS-DEVICE DIGITAL PEN PAIRING

(71) Applicant: MICROSOFT TECHNOLOGY LICENSING, LLC, Redmond, WA (US)

(72) Inventors: Chintan M. Bakshi, Redmond, WA (US); Tejas Jitendra Mistry, Sammamish, WA (US); Steven Nabil Bathiche, Kirkland, WA (US); Vineet Thuvara, Sammamish, WA (US); Justin Allan Coppin, Windsor, CO (US); Joy Gilbert Jeganathan, Longmont, CO (US); Alain Luc Michaud, Quebec (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 793 days.

(21) Appl. No.: 14/679,704

(22) Filed: Apr. 6, 2015

(65) Prior Publication Data

US 2016/0294973 A1    Oct. 6, 2016

(51) Int. Cl.
| | |
|---|---|
| G06F 15/16 | (2006.01) |
| H04L 29/08 | (2006.01) |
| G06F 3/0354 | (2013.01) |
| G06F 3/048 | (2013.01) |
| H04L 29/06 | (2006.01) |
| G06F 21/44 | (2013.01) |
| G06F 21/64 | (2013.01) |

(52) U.S. Cl.
CPC ........ *H04L 67/306* (2013.01); *G06F 3/03545* (2013.01); *G06F 3/048* (2013.01); *G06F 21/44* (2013.01); *G06F 21/64* (2013.01); *H04L 63/08* (2013.01); *H04L 67/10* (2013.01); *H04L 67/36* (2013.01)

(58) Field of Classification Search
CPC ... H04L 67/306; G06F 3/03545; G06F 3/048; G06F 21/44; G06F 21/64
See application file for complete search history.

(56) References Cited

U.S. PATENT DOCUMENTS 6,249,276 B1    6/2001 Ohno
9,313,289 B2 *  4/2016 Lin .......................... H04L 67/26
(Continued)

OTHER PUBLICATIONS

"International Search Report & Written Opinion Received for PCT Application No. PCT/US2016/024604", dated Jun. 20, 2016, 10 Pages.
"Livescribe 3 Smartpen Pro Edition", Available at: http://store.apple.com/us/product/HE043ZM/A/livescribe-3-smartpen-pro-edition, Published on Dec. 27, 2013, 5 pages.
(Continued)

*Primary Examiner* — Moustafa M Meky

(57) ABSTRACT

Examples of the disclosure enable managing a user account, such that a peripheral device is configured to interact with one or more user devices associated with the user account. In some examples, a device identity associated with the peripheral device is identified, and it is determined whether the device identity is associated with a user account. Upon determining that the device identity is associated with the user account, the peripheral device is paired with a user device associated with the user account without manually pairing the peripheral device with the user device. Examples of the disclosure enable the peripheral device to interact with one or more user devices in an efficient, user-friendly manner.

20 Claims, 5 Drawing Sheets

(56) References Cited

U.S. PATENT DOCUMENTS

| | | | |
|---|---|---|---|
| 9,444,902 B2* | 9/2016 | Lin | H04L 67/26 |
| 2003/0093690 A1 | 5/2003 | Kemper | |
| 2006/0125805 A1* | 6/2006 | Marggraff | G06F 3/03545 |
| | | | 345/179 |
| 2012/0192250 A1 | 7/2012 | Rakan | |
| 2012/0221944 A1 | 8/2012 | Bloomfield et al. | |
| 2012/0227098 A1 | 9/2012 | Obasanjo et al. | |
| 2013/0181953 A1 | 7/2013 | Hinckley et al. | |
| 2014/0029811 A1 | 1/2014 | Delia et al. | |
| 2014/0118314 A1 | 5/2014 | Black et al. | |
| 2014/0123214 A1 | 5/2014 | Black et al. | |
| 2014/0253467 A1 | 9/2014 | Hicks et al. | |
| 2014/0253469 A1 | 9/2014 | Hicks et al. | |
| 2014/0359018 A1* | 12/2014 | Sun | G05B 15/02 |
| | | | 709/204 |
| 2015/0052235 A1* | 2/2015 | Tokunaga | H04L 67/16 |
| | | | 709/223 |
| 2015/0081763 A1* | 3/2015 | Sipola | A61B 5/00 |
| | | | 709/203 |
| 2015/0264731 A1* | 9/2015 | Lin | H04L 67/26 |
| | | | 455/41.2 |
| 2015/0347738 A1* | 12/2015 | Ulrich | G06F 21/35 |
| | | | 726/17 |
| 2015/0351142 A1* | 12/2015 | Seymour | H04M 1/72519 |
| | | | 455/41.3 |
| 2015/0351143 A1* | 12/2015 | Seymour | H04M 1/72519 |
| | | | 455/41.2 |
| 2016/0241605 A1* | 8/2016 | Taboriskiy | H04W 76/02 |

OTHER PUBLICATIONS

"Wacom Expands Its Digital Pen Technology Line-up Offering Total Pen Solution for the Age of "Digital Stationery"", Available at: http://www.wacom.com/sitecore/content/shared-datasources/news-and-events/germany/2014/de-1057?sc_lang=de-DE, Published on Mar. 11, 2014, 2 pages.

"Livescribe Smartpen User Guide Version 2.5", Available at: http://www.livescribe.com/en-us/media/pdf/support/SmartpenUserManual.pdf, Published on Oct. 5, 2010, 145 pages.

Broida, Rick, "Fund This: Equil Smartpen 2 Turns Handwritten Notes into Digital Ones", Available at: http://www.cnet.com/news/fund-this-equil-smartpen-2-turns-handwritten-notes-into-digital-ones/, Published on Oct. 8, 2014, 3 pages.

Kruk, Oleg, "A Digital Pen in an IoT System with the DeviceHive Platform", Available at: http://www.devicehive.com/blog/digital-pen-iot-system-devicehive-platform, Published on Jun. 26, 2014, 3 pages.

"Adobe Releases Ink Digital Pen, Slide Digital Ruler, New Line and Sketch iOS Apps", Available at: http://www.iclarified.com/41729/adobe-releases-ink-digital-pen-slide-digital-ruler-new-line-and-sketch-ios-apps, Published on Jun. 19, 2014, 2 pages.

Endler, Michael, "Microsoft Releases OneNote For Android Tablets", Available at: http://www.informationweek.com/cloud/software-as-a-service/microsoft-releases-onenote-for-android-tablets/d/d-id/1298108, Published on Aug. 20, 2014, 9 pages.

"Second Written Opinion Issued in PCT Application No. PCT/US2016/024604", dated Mar. 29, 2017, 7 Pages.

* cited by examiner

CLOUD-BASED CROSS-DEVICE DIGITAL PEN PAIRING

BACKGROUND

At least some peripheral devices are paired with or are coupled to a user device, such that the peripheral device may be used with the user device. Known methods and systems for pairing are tedious, cumbersome, or time consuming and, in at least some cases, do not result in a positive user experience. For example, at least some known methods and systems for pairing involve initiating a pairing sequence, monitoring for a signal associated with the pairing sequence, and responding to the signal. Moreover, known methods and systems for pairing are restrictive. For example, at least some known methods and systems for pairing enable a peripheral device to be paired with only a single device at a time. In such instances, when a user has a plurality of peripheral devices or a plurality of user devices, the user may be required to pair or unpair one or more peripheral devices or user devices on an as-needed basis.

BRIEF DESCRIPTION OF THE DRAWINGS

Corresponding reference characters indicate corresponding parts throughout the drawings.

DETAILED DESCRIPTION

Examples of the disclosure enable a peripheral device to be paired with one or more user devices at a given time. Some examples include associating a device identity that is associated with a peripheral device with a user account, and associating the device identity with one or more user devices that are associated with the user account, such that the peripheral device is configured to interact with each user device associated with the user account. In some examples, a user device identifies a device identity that is associated with the peripheral device and determines whether the device identity is associated with a user account. Upon determining that the device identity is associated with the user account, the peripheral device is paired with the user device without manually pairing the peripheral device with the user device.

Aspects of the disclosure enable a peripheral device, such as a digital pen or stylus, to be efficiently and effectively used across a plurality of user devices. A single digital pen may be paired with a plurality of user devices using a cloud-based, cross-device digital pen pairing system, such that the digital pen is useable with each user device of the plurality of user devices. Additionally or alternatively, a plurality of digital pens may be paired with a single user device using the cloud-based, cross-device digital pen pairing system, such that the user device is responsive to each digital pen of the plurality of digital pens. Each digital pen may be configured to interact with each user device in a unique manner. In this way, the peripheral devices and the user devices may be used to enable better personalization and novel functionality in an efficient and effective manner. By incorporating peripheral device or user account management in the manner described in this disclosure, some examples increase system functionality, improve user efficiency via user interface interaction, increase user interaction performance, and/or reduce error rate.

Figure 1:
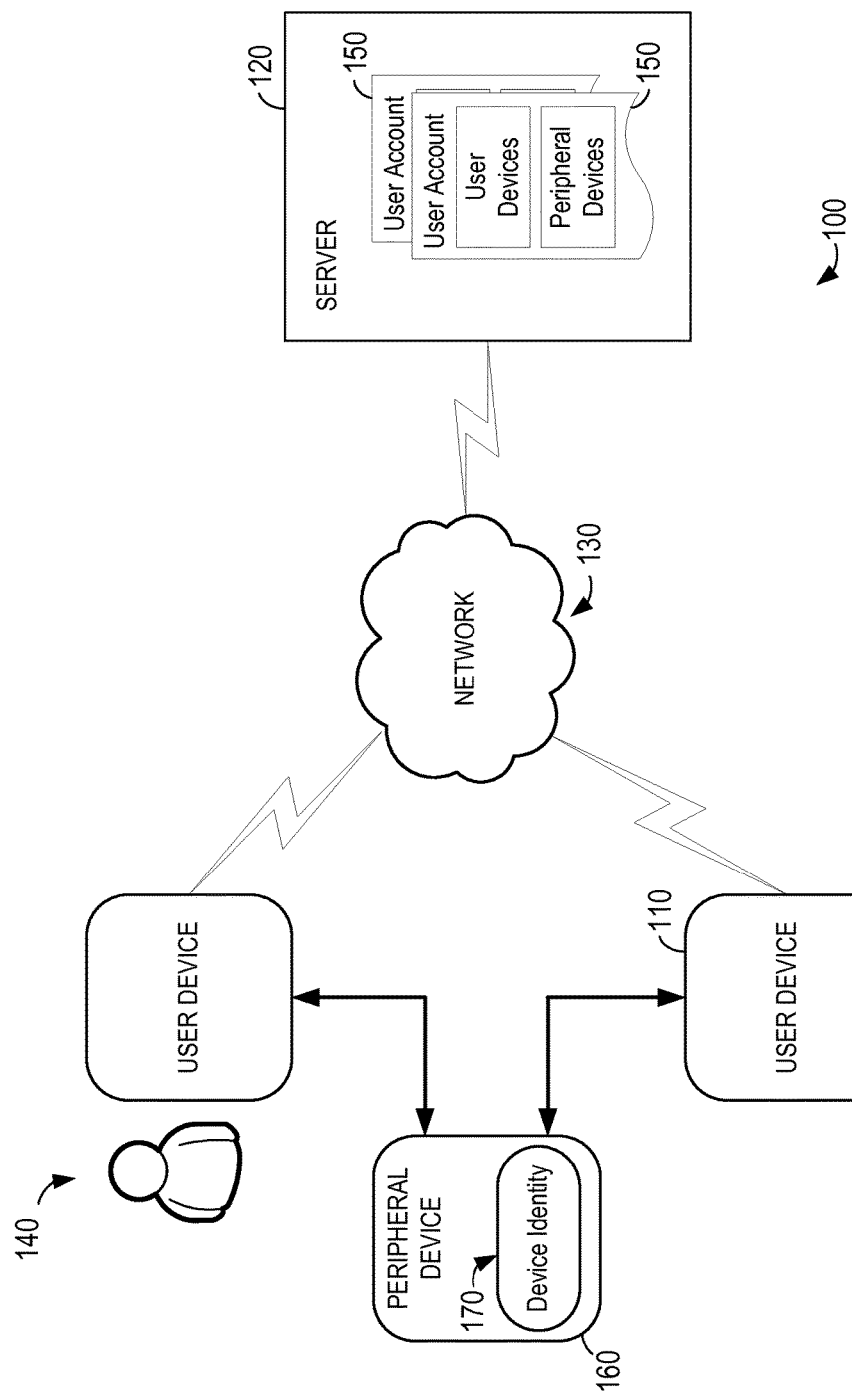
FIG. 1 is a schematic diagram illustrating an example environment for managing a user account across one or more user devices.

FIG. 1 is a schematic diagram illustrating an example environment 100 that includes one or more user devices 110 (e.g., tablet, smartphone, television, video game console, desktop, laptop). A cloud-based server 120 is coupled to the user devices 110 via a network 130. The network 130 includes wireless and/or wired communication protocols and enables a user device 110 to communicate with the server 120 and/or with other user devices 110.

A user 140 may access a user account 150 associated with the user 140 by logging on to one or more user devices 110 (e.g., by providing a login name and password), such that the user devices 110 are associated with the user 140 or the user account 150. A user device 110 remains associated with the user account 150 until the user device 110 is disassociated from the user account 150. Additionally or alternatively, the user device 110 remains associated with the user account 150 until a predetermined event occurs or a predetermined amount of time lapses since logging on to the user device 110.

The server 120 is configured to store or manage one or more user accounts 150, such that the user 140 may access the user account 150 by logging on to any user device 110 coupled to the server 120. Alternatively, the user account 150 may be stored at any location that enables the environment 100 to function as described herein. The user account 150 is associated with or includes one or more user settings (e.g., user preferences) that enable one or more functionalities of the user devices 110 to be customized User settings include, for example, an operating mode (e.g., function loadout such as write, erase, highlight), a device priority, an ink color, a font size, a font, a pen pressure curve, and a pen-button assignment (e.g., function loadout for the buttons).

One or more peripheral devices 160 (e.g., digital pen, keyboard, mouse, remote control, monitor, speaker, printer) are coupleable to the user device 110 or to the server 120, such that the peripheral device 160 is configured to interact with the user device 110. In at least some examples, the user 140 provides user input to the user device 110 via the peripheral device 160. For example, the user 140 may use the peripheral device 160 to provide input to an application executing on the user device 110 by selecting, highlighting, erasing, or writing on a display surface (e.g., a digitizing flat panel display) of the user device 110. Additionally or alternatively, the user device 110 may present user output to the user 140 via the peripheral device 160. The user 140 may use the peripheral device 160 to interact with the user device 110 in any manner that enables the environment 100 to function as described herein.

The peripheral device 160 is configured to be paired with the user device 110, such that the peripheral device 160 is identified or recognized as a device authorized to interact with the user device 110. For example, the peripheral device 160 may transmit a signal indicating a presence of the peripheral device 160 or requesting a secure connection, and the user device 110 may detect the signal, acknowledge the presence of the peripheral device 160, and confirm the secure connection. In at least some examples, a device identity 170 identifying the peripheral device 160 is transmitted from the peripheral device 160 to the user device 110, and the user device 110 compares the device identity 170 to an expected value (e.g., using a hashing algorithm or lookup table) to determine an integrity of the device identity 170. The peripheral device 160 may be paired to the user device 110 using any device-to-device interaction protocol such as BLUETOOTH brand wireless technology standard, WI-FI brand local area wireless technology, WI-FI DIRECT brand Wi-Fi standard, near field communication (NFC) technology, received signal strength indicator (RSSI) technology, or proprietary radio protocols (BLUETOOTH is a trademark of Bluetooth Special Interest Group, and WI-FI and WI-FI DIRECT are trademarks of the Wi-Fi Alliance). Alternatively, the peripheral device 160 may be paired with or coupled to the user device 110 in any manner that enables the environment 100 to function as described herein.

The peripheral device 160 is associated with a unique device identity 170 (e.g., serial number, media access control or MAC address unique among other peripheral devices 160) that uniquely identifies the peripheral device 160. For example, the device identity 170 may include or be associated with a BLUETOOTH brand address. Alternatively, the peripheral device 160 may be identified in any manner that enables the environment 100 to function as described herein. In at least some examples, the user device 110 generates a notification indicating or confirming that the peripheral device 160 is an authorized device (e.g., that the device identity 170 is associated with the user device 110).

The peripheral device 160 may be associated with the user 140, such that the user 140 may use the peripheral device 160 with any user device 110 associated with the user 140. For example, the server 120 may assign the device identity 170 to the user account 150, such that the peripheral device 160 is configured to interact with any user device 110 associated with the user account 150. In at least some examples, a user device 110 transmits, to the server 120, a signal indicating that the peripheral device 160 is authorized to interact with the user device 110 and, based on the signal, a server 120 associates the peripheral device 160 with a user account 150 associated with the user device 110.

The server 120 is configured to identify one or more user devices 110 associated with the user account 150, assign the device identity 170 to the user devices 110 such that the peripheral device 160 is configured to interact with the user devices 110 (e.g., the peripheral device 160 is authorized to interact with one or more user devices 110 associated with the user account 150), and transmit, to each user device 110, a signal indicating the assignment of the device identity 170 to the user devices 110. In at least some examples, each user device 110 generates a notification indicating or confirming that the peripheral device 160 is an authorized device (e.g., that the device identity 170 is associated with the user device 110). The user device 110 may identify the peripheral device 160 as an authorized device (e.g., the peripheral device 160 is paired or coupled with the user device 110) without manually pairing the peripheral device 160 from the user device 110.

The device identity 170 may be selectively associated with one or more user devices 110, such that the peripheral device 160 is configured to interact with each user device 110 of the selectively associated user devices 110. In at least some examples, the device identity 170 is associated with a first set of user devices 110, such that the peripheral device 160 is configured to interact with each user device 110 of the first set of user devices 110 and/or is not associated with a second set of user devices 110, such that the peripheral device 160 is not configured to interact with each user device 110 of the second set of user devices 110.

The peripheral device 160 is configured to receive user input from the user 140 and transmit a signal associated with the user input to the user device 110. The user device 110 may determine whether to execute an operation associated with the user input based on one or more parameters. For example, the user device 110 may determine whether to execute the operation based on a proximity of the peripheral device 160 to the user device 110. In at least some examples, the user device 110 transmits a signal associated with the user input to the server 120, and the server 120 determines or identifies one or more user devices 110 that are to execute the operation based on one or more parameters. For example, the server 120 may determine, for each user device 110 associated with a user account 150, whether the user device 110 is to execute the operation.

The user 140 may add, remove, edit, or update a functionality of the peripheral device 160 or user device 110. For example, the user device 110 may transmit a signal associated with the addition, removal, edit, or update of the user setting to the server 120 and, based on the signal, the server 120 may create, edit, or update the user settings. In at least some examples, the server 120 associates the creation, edit, or update of the user setting with the user account 150 and transmits the created, edited, or updated user setting to one or more user devices 110 associated with the user account 150, such that the peripheral device 160 is configured to interact with each user device 110 of the user devices 110 in accordance with the user setting. One or more user settings may be propagated across user devices 110 such that the user settings may be used for multiple user devices 110.

In one configuration, the device identity 170 of the peripheral device 160 may be actively disassociated from the user device 110 (e.g., a paired peripheral device 160 may be unpaired or decoupled from the user device 110), such that the peripheral device 160 is not configured to interact with the user device 110. For example, the user device 110 may transmit, to the server 120, a signal indicating that the peripheral device 160 is not authorized to interact with the user device 110 (e.g., a disassociation of the device identity 170 from the user device 110) and, based on the signal, the server 120 may disassociate the peripheral device 160 from a user account 150 associated with the user device 110, such that the peripheral device 160 is not configured to interact with the remaining user devices 110 associated with the user account 150 (e.g., the peripheral device 160 is unpaired or decoupled from each user device 110 associated with the user account 150). That is, a peripheral device 160 may be unpaired from a user device 110 without manually unpairing the peripheral device 160 from the user device 110. In at least some examples, each user device 110 generates a notification indicating or confirming to the user that the peripheral device 160 is not an authorized device.

Figure 2:
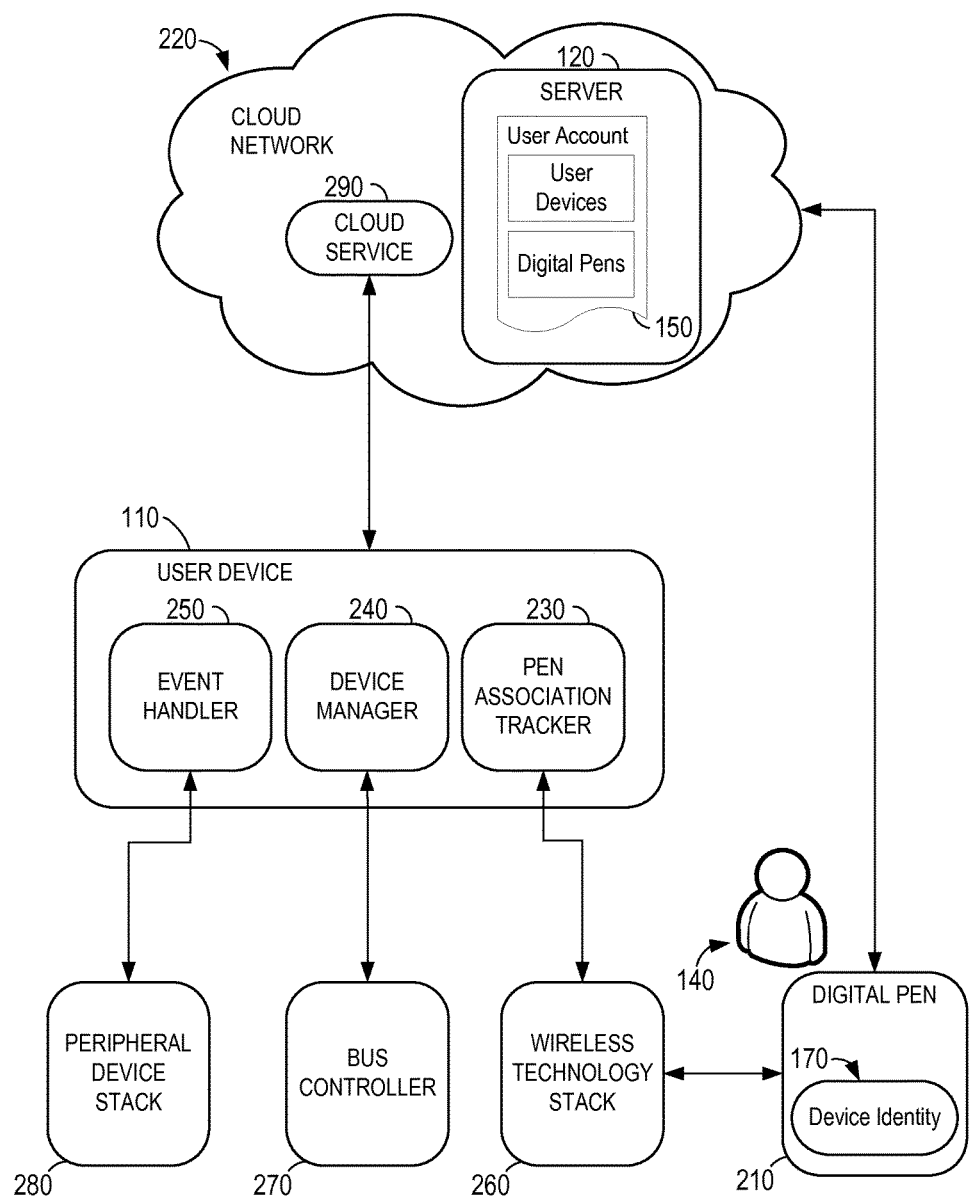
FIG. 2 is a schematic diagram illustrating an example system for managing a user account in an environment, such as the environment shown in FIG. 1.

FIG. 2 is a schematic diagram illustrating an example system 200 that includes a user device 110, a digital pen 210 (e.g., peripheral device 160), and a cloud network 220. The cloud network 220 includes or is accessed via the network 130 (shown in FIG. 1).

The user device 110 includes a pen association tracker 230, a device manager 240, and an event handler 250. The pen association tracker 230 detects or identifies the digital pen 210 in accordance with a wireless technology stack 260 (e.g., BLUETOOTH brand stack), which manages or controls communication between the digital pen 210 and the user device 110. The device manager 240 is a tool that enables the user device 110 to create or manage device configurations associated with a device (e.g., digital pen 210). The device manager 240 is coupled to a bus controller 270 that enables one or more devices (e.g., digital pen 210) to communicate with each other with little no intervention from the user device 110. The event handler 250 processes actions or input, such as keystrokes or mouse movements, in accordance with a peripheral device stack 280, which manages or controls communication between the peripheral device and the user device 110.

The user device 110 is configured to track a list of peripheral devices 160 (e.g., through device identities 170) and manage interaction with the peripheral devices 160 on the list. In at least some examples, the user device 110 registers or is registered with an application programming interface (API) and activates monitoring of pattern-matched BLUETOOTH brand low energy advertising packets. The digital pen 210 may signal an event or action (e.g., click) by sending a BLUETOOTH brand low energy advertising packet including or associated with the device identity 170 and a customized command payload. User devices 110 configured to monitor for this device identity 170 receive notification of the advertising packet from the API, decode the command payload, and/or perform a desired action associated with the command payload (e.g., launch a desired application). As advertising packets may be sent to and received by any compatible device (e.g., any device configured to use BLUETOOTH brand technology) without establishing a connection, in at least some examples, user devices 110 and peripheral devices 160 may interact with each other without previous encounter or knowledge of each other.

The user device 110 may use RSSI technology to make intelligent operational or functional decisions. For example, a user device 100 may use RSSI-threshold monitoring to design algorithms that determine which user devices 110 take action in response to receiving an advertising packet (e.g., determines whether a single user device 110 takes action or whether multiple user devices 110 take action). For data transfers that require secure data channels, the user device 100 may initiate establishing a connection with the digital pen 210 in response to the advertising packet and switch to a secure connection mode. In at least some examples, the connection is dissolved after the data transfer, and the user device 10 switches back to an advertising mode.

The cloud network 220 or the server 120 includes or is associated with a cloud service 290 that interfaces with the user device 110 such that the digital pen 210 is configured to interact with the user device 110 without manually pairing the digital pen 210 with the user device 110 (e.g., the pen association tracker 230 detects or identifies the digital pen 210 without going through the wireless technology stack 260). The server 120 is configured to associate the device identity 170 with the user account 150, identify the user device 110, and associate the digital pen 210 with the user device 110 via the cloud service 290.

Figure 3:
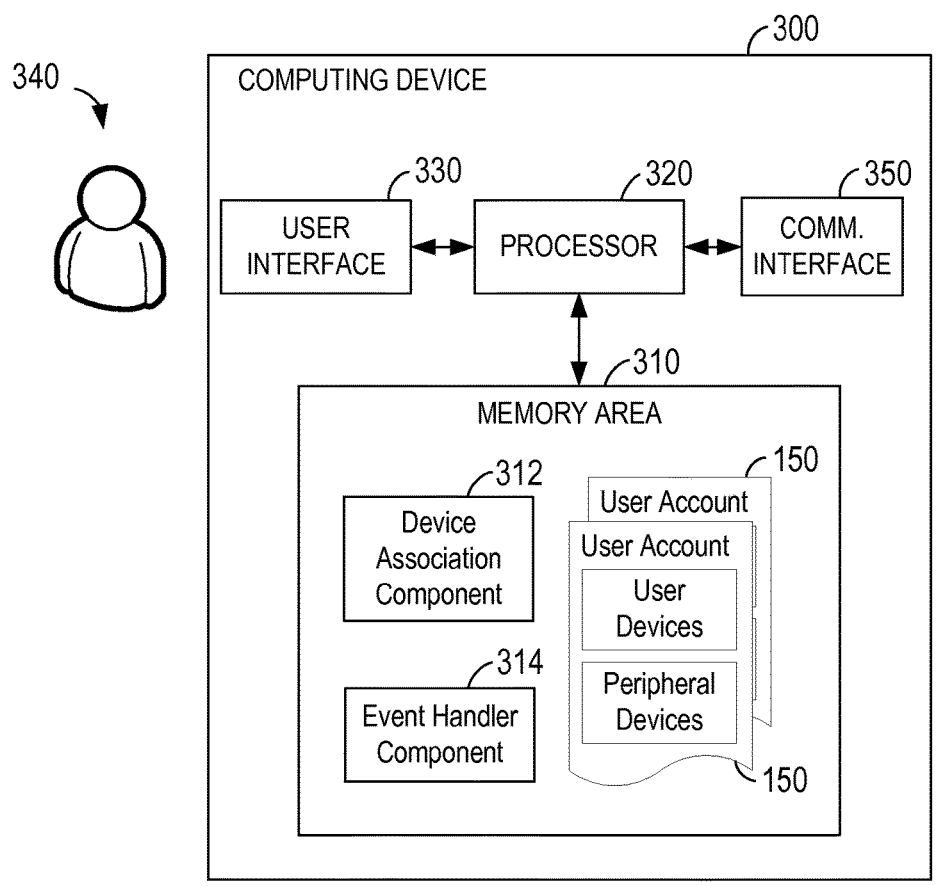
FIG. 3 is a schematic diagram illustrating an example computing device that may be used in a system, such as the system shown in FIG. 2.

FIG. 3 is a schematic diagram illustrating an example computing device 300, such as a server 120 (shown in FIG. 1), a user device 110 (shown in FIG. 1), and a peripheral device 160 (shown in FIG. 1), such as a digital pen. While some examples of the disclosure are illustrated and described herein with reference to a computing device being a server 120, a user device 110, or a peripheral device 160, aspects of the disclosure are operable with any computing device or server that executes instructions to implement the operations and functionality associated with the computing device or server. For example, the computing device 300 may include a portable media player, a mobile telephone, a tablet, a netbook, a laptop, a desktop computer, a computing pad, a kiosk, a tabletop device, an industrial control device, a wireless charging station, an electric automobile charging station, and other computing devices. Additionally, the computing device 300 may represent a group of processing units or other computing devices. Additionally, any computing device described herein (e.g., the server 120, user device 110, or peripheral device 160) may be configured to perform any operation described herein including one or more operations described herein as being performed by another computing device.

The computing device 300 includes one or more computer-readable media, such as a memory area 310 storing computer-executable instructions, a device association component 312, an event handler component 314, user accounts 150, user settings, device identities, and other data, and one or more processors 320 programmed to execute the computer-executable instructions for implementing aspects of the disclosure. The memory area 310 includes any quantity of media associated with or accessible by the computing device. The memory area 310 may be internal to the computing device (as shown in FIG. 3), external to the computing device (not shown), or both (not shown).

The processor 320 includes any quantity of processing units, and the instructions may be performed by the processor 320 or by multiple processors within the computing device or performed by a processor external to the computing device. The processor 320 is programmed to execute instructions such as those illustrated in the figures (e.g., FIGS. 4 and 5).

In some examples, the processor 320 is transformed into a special purpose microprocessor by executing computer-executable instructions or by otherwise being programmed For example, the device association component 312, when executed by the processor 320, causes the processor 320 to associate a device identity with a user account, identify one or more user devices associated with the user account, and associate the device identity with the user devices; the event handler component 314, when executed by the processor 320, causes the processor 320 to determine whether a user device 110 is to execute an operation associated with a user input. Although the processor 320 is shown separate from the memory area 310, examples of the disclosure contemplate that the memory area 310 may be onboard the processor 320 such as in some embedded systems.

The computing device 300 includes at least one user interface 330 for exchanging data between the computing device 300 and a user 340. For example, the user interface 330 includes or is coupled to a presentation device (not shown) configured to present information, such as text, images, audio, video, graphics, alerts, and the like, to the user 340. The presentation device may include, without limitation, a display, a speaker, or a vibrating component. Additionally or alternatively, the user interface 330 includes or is coupled to an input device (not shown) configured to receive information, such as user commands, from the user 340. The input device may include, without limitation, a controller, a camera, a microphone, or an accelerometer. In at least some examples, the presentation device and the input device are integrated in a common user interface 330 configured to present information to the user 340 and receive information from the user 340. For example, the user-interface device may include, without limitation, a capacitive touch screen display or a controller including a vibrating component.

The computing device 300 includes at least one communication interface 350 for exchanging data between the computing device 300 and a computer-readable media or another computing device. For example, the server 120 may be coupled to the user device 110 and/or the peripheral device 160 via the network 130. Communication between the computing device 300 and a computer-readable media or another computing device may occur using any protocol or mechanism over any wired or wireless connection.

The block diagram of FIG. 3 is merely illustrative of an example system that may be used in connection with one or more examples of the disclosure and is not intended to be limiting in any way. Further, peripherals or components of the computing devices known in the art are not shown, but are operable with aspects of the disclosure. At least a portion of the functionality of the various elements in FIG. 3 may be performed by other elements in FIG. 3, or an entity (e.g., processor, web service, server, applications, computing device, etc.) not shown in FIG. 3.

Figure 4:
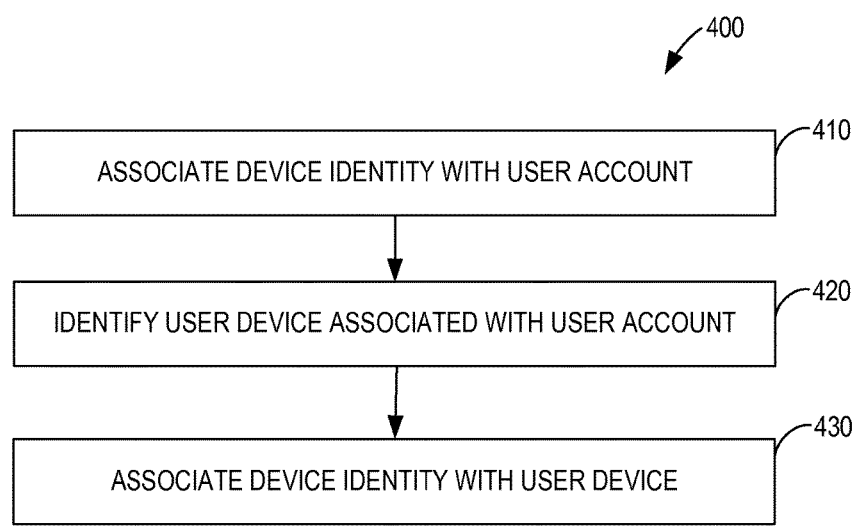
FIG. 4 is a flow chart illustrating an example method of managing a user account using a cloud-based computing device, such as the computing device shown in FIG. 3.

FIG. 4 is an example flow chart illustrating a method 400 of managing one or more user accounts 150 across one or more user devices 110. A device identity 170 associated with a peripheral device 160 (e.g., digital pen) is associated with a user account 150 associated with a user 140 at 410. In at least some examples, the device identity 170 is associated with the user account 150 when the user 140 purchases or acquires the peripheral device 160, and the user account 150 is updated to include the peripheral device 160 as an authorized or associated device. In another example, the device identity 170 is associated with the user account 150 when the server 120 receives a signal from a user device 110 associated with the user account 150 indicating that the peripheral device 160 is paired with the user device 110. Alternatively, the device identity 170 may be associated with the user account 150 at any time that enables the environment 100 to function as described herein.

The user account 150 may be associated with one or more user devices 110 and with one or more peripheral devices 160. One or more user devices 110 associated with the user account 150 are identified at 420, and the device identity 170 is associated with the user devices 110 at 430, such that the peripheral device 160 is configured to interact with each user device 110 that is associated with the user account 150. Associating the device identity 170 with the user devices 110 ensures recognition and consistent interaction of the peripheral device 160 across one or more user devices 110 associated with the user account 150 without explicit setup or configuration of each peripheral device 160-user device 110 combination. Additionally, this association may enable a plurality of peripheral devices 160 to interact across the user devices 110 associated with the user account 150 in an unlimited manner. For example, each peripheral device 160 is authorized to interact with, has full functionality when used with, or is not restricted from interacting with each user device 110 associated with the user account 150 without an individualized or targeted pairing with a user device 110. Accordingly, in at least some examples, a peripheral device 160 may be configured to interact with a user device 110 on a first physical encounter between the peripheral device 160 and the user device 110.

The device identity 170 may be disassociated from a user device 110. For example, a peripheral device 160 may be authorized for a predetermined period of time to perform a predetermined operation. Based on the disassociation, other user devices 110 associated with the user account 150 may be identified, and the device identity 170 may be disassociated from the other user devices 110. In at least some examples, the device identity 170 is disassociated from the user account 150.

The server 120 communicates with each user device 110 and/or the peripheral device 160 to detect or identify an addition to or removal of the device identity 170 from a list of authorized device identities associated with the user account 150. The user device 110 then listens for data associated with one or more of the peripheral devices 160 associated with the user account 150 (e.g., filters incoming packets to look for device identities 170).

In at least some examples, each user device 110 is notified with details associated with the addition or removal, such that authorized peripheral devices 160 are configured to interact with each user device 110 associated with the user account 150 and/or unauthorized peripheral devices 160 are not configured to interact with any user device 110 associated with the user account 150. For example, a signal corresponding to an association of the device identity 170 with the user device 110 may be transmitted to the user device 110, such that the user device 110 is configured to generate a notification indicating that the device identity 170 is associated with the user device 110 or that the peripheral device 160 is configured to interact with the user device 110. Additionally, a signal associated with the disassociation of the device identity 170 from the user device 110 may be transmitted to the user device 110, such that the user device 110 is configured to generate a notification indicating that the device identity 170 is disassociated from the user device 110.

In at least some examples, the peripheral device 160 receives user input from the user 140, and the peripheral device 160 transmits a signal associated with the user input (e.g., a data packet including the device identity 170 and a command payload). One or more user devices 110 paired with the peripheral device 160 may receive the signal, determine whether to perform an operation associated with the user input, or perform the operation associated with the user input. The signal may be transmitted from the peripheral device 160 directly or indirectly (e.g., via a user device 110) to the server 120, and the server 120 identifies a first set of user devices 110 for performing the operation and/or a second set of user devices 110 for not performing the operation.

The peripheral device 160 may be configured to interact with any number of user devices 110 associated with a common user account 150. For example, a peripheral device 160 may be configured to seamlessly interact with a first user device 110 and a second user device 110, each associated with the same user account 150. In one configuration, any number of peripheral devices 160 may be configured to interact with a user device 110 (e.g., the user device 110 is a public device). In some examples, a plurality of peripheral devices 160, each associated with a respective user account 150 (or not associated with any user account 150), may be configured to interact with a common user device 110. In other examples, a plurality of peripheral devices 160 associated with a common user account 150 are configured to interact with a common user device 110.

Input associated with each peripheral device 160 may be tagged or associated with the device identity 170 or user account 150, such that the input may be attributable to the corresponding peripheral device 160 or user 140. For example, a first peripheral device 160 may be configured to interact with a user device 110 in accordance with a first user setting (e.g., a first peripheral device 160 may write on a display surface of the user device 110 in a first color), and a second peripheral device 160 may be configured to interact with the user device 110 in accordance with a second user setting (e.g., a second peripheral device 160 may write on the display surface of the user device 110 in a second color). A plurality of a common type of peripheral devices 160 (e.g., digital pens) may be used with a common user device 110. A plurality of different types of peripheral devices 160 (e.g., a digital pen and a keyboard) may also be used with a common user device 110.

The user device 110 is configured to manage data or information (e.g., signals) received from a plurality of peripheral devices 160. The environment 100 offers a capability and flexibility to customize behavior for interaction across multiple user devices 110 (e.g. a single user device 110 responds in priority order or multiple user devices 110 respond simultaneously). The user device 110 may arbitrate between the peripheral devices 160. For example, the user device 110 may execute, filter, block, or ignore at least some signals received from a peripheral device 160. In at least some examples, the user device 110 determines with which peripheral device 160 to interact based on a proximity of the peripheral devices 160 (e.g., a nearer peripheral device 160 has priority over a farther peripheral device 160), a signal strength associated with the peripheral devices 160 (e.g., a peripheral device 160 associated with a stronger signal has priority over a peripheral device 160 associated with a weaker signal), a temporal parameter associated with the peripheral devices 160 (e.g., a later-used peripheral device 160 has priority over an earlier-used peripheral device 160), or a user setting. The user device 110 may include or be associated with an event handler that manages signals received from a peripheral device 160. The event handler may refer to a table linking data or information received from a peripheral device 160 with an application-specific operation.

In at least some examples, a signal associated with a user setting is received, and the user setting is associated with the user account 150, such that the peripheral device 160 is configured to interact with each user device 110 associated with the user account 150 in accordance with the user setting. For example, user preferences (e.g., pen pressure curves, pen-button assignments) may be propagated across or shared with one or more user devices 110. Additionally or alternatively, user interaction may be customized for each user device 110, such that each user device 110 has a corresponding user setting. In some configurations, one or more user devices 110 may interact with the peripheral device 160 simultaneously or in a predetermined order. The peripheral device 160 and the user device 110 may be each associated with a unique authentication factor that enables multi-factor authentication. In at least some examples, the user device 110 acknowledges or recognizes that the peripheral device 160 is associated with the user account 150. In such examples, the peripheral device 160 and the user device 110 may be used for digital signatures in a legally-binding situation. For example, the user device 110 may present a document to the user 140, and the user 140, using a peripheral device 160 uniquely associated with the user 140, may inject or associate a token uniquely associated with the user 140 or user account 150 into or with the document.

Figure 5:
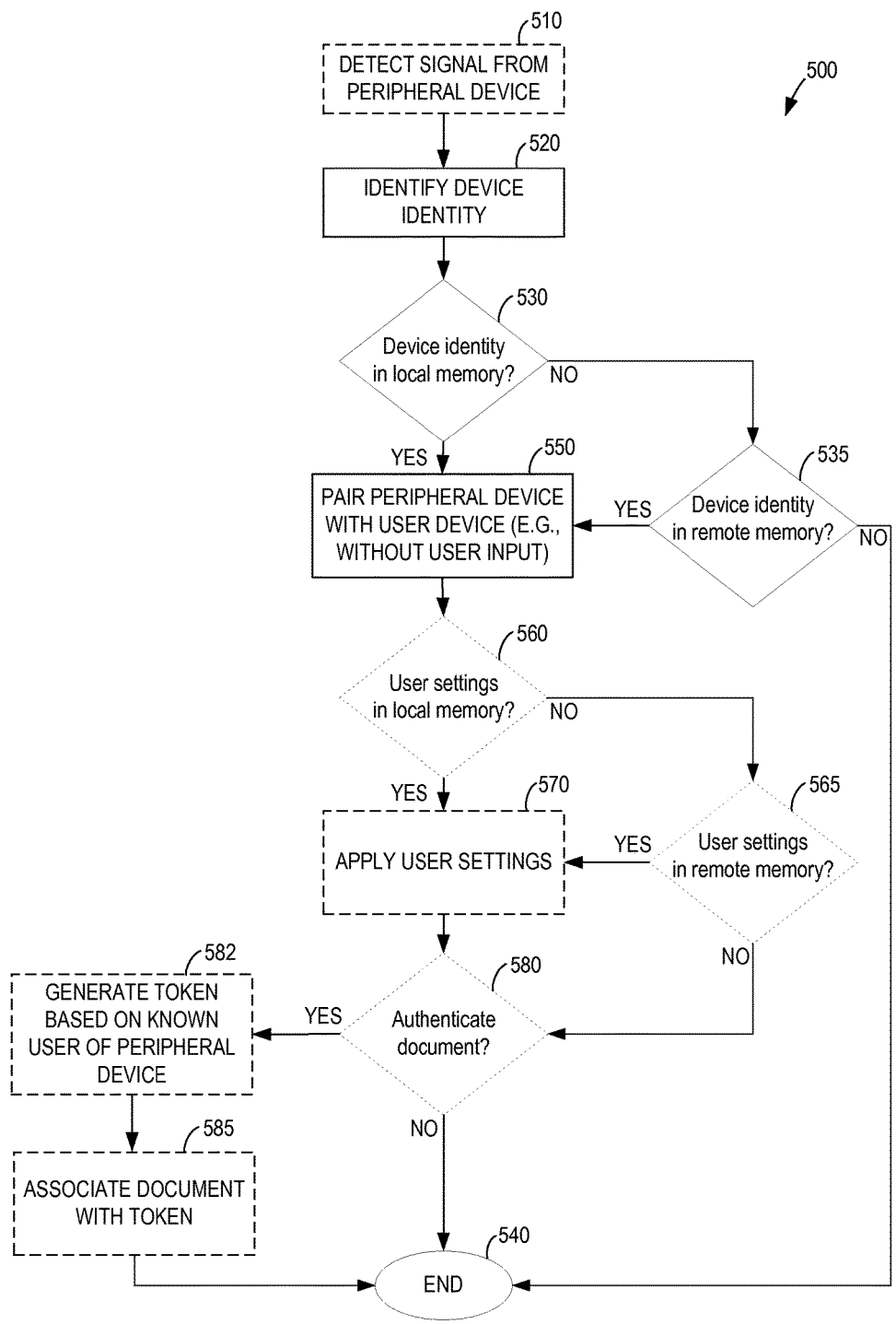
FIG. 5 is a flow chart illustrating an example method of managing a user account using a local computing device, such as the computing device shown in FIG. 3.

FIG. 5 is an example flow chart illustrating a method 500 of managing one or more user accounts 150 at a local user device 110 associated with a user account 150. A device identity 170 associated with a peripheral device 160 (e.g., digital pen) is associated with the user account 150. The user device 110 detects or receives at 510 a signal including or associated with the device identity 170 from the peripheral device 160. Alternatively, the user device 110 may receive the signal from the server 120.

The device identity 170 is identified at 520, and it is determined whether the device identity 170 is associated with the user account 150. It may be determined at 530 whether the device identity 170 is stored in a local memory (e.g., at the user device 110) and, in at least some examples (e.g., upon determining that the device identity 170 is not stored in the local memory), it is determined at 535 whether the device identity 170 is stored in a remote memory (e.g., at the server 120 and/or in the cloud). Upon determining that the device identity 170 is not associated with the user device 150, the peripheral device 160 is not paired with the user device 110 and the method 500 ends at 540. The peripheral device 160 may be manually paired with the user device 110 when the device identity 170 is not associated with the user device 150.

Upon determining that the device identity 170 is associated with the user device 150 (e.g., at user device 110 or at the server 120), the peripheral device 160 is automatically paired at 550 with the user device 110, such that the peripheral device 160 is configured to interact with the user device 110 without manually pairing the peripheral device 160 with the user device 110. It is determined whether one or more user settings (e.g., user preferences) are associated with the user account 150 or applicable to the peripheral device 160 or user device 110. It may be determined at 560 whether one or more user settings are stored in a local memory (e.g., at the user device 110) and, in at least some examples (e.g., upon determining that one or more settings are not stored in the local memory), it is determined at 565 whether one or more user settings are stored in a remote memory (e.g., at the server 120 and/or in the cloud).

Upon determining that one or more user settings are associated with the user account 150 or applicable to the peripheral device 160 or user device 110, the peripheral device 160 is associated with the user settings and the user settings are applied at 570 such that the peripheral device 160 is configured to interact with the user device 110 in accordance with the user settings. Example user settings include ink color, ink size, and pen-button assignment for the buttons on the peripheral device 160. In some examples, the user device 110 presents a document that requires authentication (e.g., a signature) and the peripheral device 160 or user device 110 may be used to authenticate the document (e.g., sign the document) in a legally-binding situation because the peripheral device 160 or user device 110 are uniquely associated with the user account 150. It is determined at 580 whether a document requires authentication. Upon determining that a document requires authentication, a token, signature, credential, or other data structure is generated based on the known user 140 of the peripheral device at 582. The token includes data for use by an entity to authenticate the document. The document is associated at 585 with the token associated with the user 140 or user account 150, such that the document is associated with the user 140 with at least some level of confidence. For example, the authentication process may be used in legally-binding scenarios. In this manner, aspects of the disclosure may authenticate the document via a mark (e.g., signature) from the user entered by a known peripheral device (e.g., digital pen) of that user after the pairing.

In at least some examples, there is peer-to-peer communication among the user devices 110 such that the device identity 170 may be shared or communicated among the user devices 110 with little or no communication with the server 120. For example, a first user device 110 may transmit a signal to a second user device 110 with which there is a trusted or secure connection. In such an example, based on the signal, the second user device 110 accepts or authorizes the device identity 170, such that the peripheral device 160 may be used with the second user device 110 without manually pairing the peripheral device 160 to the second user device 110.

The subject matter described herein enables a peripheral device to be used across a plurality of user devices efficiently and effectively. In some examples, a cloud-based user account is exploited to allow a peripheral device to be recognized or configured for consistent interaction with a plurality of user devices without explicit setup or configuration for each user device. In this way, the peripheral device may be configured to interact with a user device it may or may not have encountered before. Additionally or alternatively, a plurality of peripheral devices are associated with a common cloud-based user account, such that a user may use any peripheral device associated with the user account to interact with a user device associated with the user account. In at least some examples, the peripheral device and the user device are uniquely identified or recognized, such that the peripheral device and the user device may be used for a digital signature in a legally binding scenario.

Example computer-readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se. Example computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an example computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

The examples illustrated and described herein as well as examples not specifically described herein but within the scope of aspects of the disclosure constitute example means for managing a plurality of user accounts. For example, the elements illustrated in FIG. 1, such as when encoded to perform the operations illustrated in FIG. 4 or 5 constitute at least an example means for associating a device identity with a user account, identifying one or more user devices associated with the user account, and/or associating the device identity with the user devices.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Alternatively or in addition to the other examples described herein, examples include any combination of the following:

detecting a signal associated with the peripheral device;
    identifying a device identity associated with the peripheral device;
    determining whether the device identity is associated with a user account;
    pairing the peripheral device with a user device associated with the user account without manually pairing the peripheral device with the user device;
    generating a notification indicating that the peripheral device is paired with the user device;

identifying one or more user settings associated with the user account; and associating the user settings with the peripheral device;

associating the device identity with the user account;

authenticating a document by associating a token with the document;

disassociating the device identity from the user account;

receiving a signal indicating that the device identity is disassociated from the user account;

unpairing the peripheral device from the user device without manually unpairing the peripheral device from the user device;

generating a notification indicating that the peripheral device is unpaired from the user device;

a digital pen associated with a device identity;

a digital pen configured to receive a user input;

a digital pen configured to transmit a signal associated with the user input;

one or more user devices associated with a user account;

a user device configured to detect the digital pen;

a user device configured to transmit a signal indicating that the digital pen is authorized to interact with the user device;

a server comprising a memory area storing the user account and computer-executable instructions for managing the user account, and a processor configured to execute the computer-executable instructions;

a server configured to associate the device identity associated with the digital pen with the user account;

a server configured to associate the device identity with the user devices to allow recognition and consistent interaction of the digital pen across the user devices;

a server configured to disassociate the device identity from the user device; and a server configured to disassociate the device identity from the user account.

In some examples, the operations illustrated in FIG. 4 or 5 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

What is claimed is:

1. A computer-implemented method for managing an operation of a peripheral device, the method comprising executing on a computing device the operations of:

prior to the peripheral device being paired with any device:

receiving a device identity associated with the peripheral device; and assigning the device identify to a user account to allow recognition and consistent interaction of the peripheral device with a plurality of user devices associated with the user account such that the peripheral device associated with the device identity is configured to automatically pair and interact with each of the plurality of user devices without manually pairing the peripheral device to each of the plurality of user devices;

determining that the device identity is stored in a list of authorized device identities associated with a user account; and based at least one determining that the device identity is stored in the list of authorized device identities associated with the user account, automatically pairing the peripheral device with the plurality of user devices associated with the user account.

2. The method of claim 1, further comprising detecting a signal associated with the peripheral device, wherein the device identity is identified based on the signal.

3. The method of claim 1, further comprising associating the device identity with the user account, such that a second user device associated with the user account is configured to automatically pair the peripheral device with the second user device.

4. The method of claim 1, further comprising generating a notification indicating that the peripheral device is paired with the plurality of user devices.

5. The method of claim 1, further comprising:

receiving a signal indicating that the device identity is disassociated from the user account; and automatically unpairing the peripheral device from the one or more of the plurality of user devices.

6. The method of claim 1, further comprising:

unpairing the peripheral device from the plurality of user devices; and disassociating the device identity from the user account, such that a second user device associated with the user account is configured to automatically unpair the peripheral device from the second user device.

7. The method of claim 1, further comprising:

unpairing the peripheral device from the one or more of the plurality of user devices; and generating a notification indicating that the peripheral device is unpaired from the one of the first user device and the second user device.

8. The method of claim 1, further comprising:

identifying one or more user settings associated with the user account; and associating the user settings with the peripheral device, such that the peripheral device is configured to interact with the one or more of the plurality of user devices in accordance with the user settings.

9. The method of claim 1, further comprising authenticating a document by associating a token with the document, the token associated with the user account.

10. A user device comprising:

a memory area storing computer-executable instructions for managing an operation of a peripheral device; and a processor configured to execute the computer-executable instructions to:

prior to the peripheral device being paired with any device:

receive a device identity associated with the peripheral device; and assigning the device identify to a user account to allow recognition and consistent interaction of the peripheral device with a plurality of user devices associated with the user account such that the peripheral device associated with the device identity is configured to automatically pair and interact with each of the plurality of user devices without manually pairing the peripheral device to each of the plurality of user devices;

determine that the device identity is stored in a list of authorized device identities associated with the user account; and based at least on determining that the device identity is stored in the list of authorized device identities associated with the user account, automatically pair the peripheral device with the plurality of user devices associated with the user account.

11. The user device of claim 10, wherein the processor is configured to detect a signal associated with the peripheral device, wherein the device identity is identified based on the signal.

12. The user device of claim 10, wherein the processor is configured to:

receive a signal indicating that the device identity is disassociated from the user account; and automatically unpair the peripheral device from the plurality of user devices.

13. The user device of claim 10, wherein the processor is configured to:

unpair the peripheral device from the plurality of user devices; and disassociate the device identity from the user account, such that other user devices associated with the user account are configured to automatically unpair the peripheral device from the other user devices.

14. The user device of claim 10, wherein the processor is configured to:

identify one or more user settings associated with the user account; and associate the user settings with the peripheral device, such that the peripheral device is configured to interact with the plurality of user devices in accordance with the user settings.

15. The user device of claim 10, wherein the processor is configured to authenticate a document by associating a token with the document, the token associated with the user account.

16. A system comprising:

a plurality of user devices associated with a user account; and a server comprising a memory area storing the user account and computer-executable instructions for managing the user account, and a processor configured to execute the computer-executable instructions to:

prior to a digital pen being paired with any device:

store a device identity of the digital pen in a list of authorized device identities associated with the user account;

assign the device identity to the user account to allow recognition and consistent interaction of the digital pen with each of the plurality of user devices associated with the user account, such that the digital pen associated with the device identity is configured to automatically pair and interact with each of the of the plurality of user devices without manually paring the peripheral device to each of the plurality of user devices;

determine that the device identity is stored in a list of authorized device identities associated with the user account; and based at least on determining that the device identity is stored in the list of authorized device identities associated with the user account, automatically pair the peripheral device with the plurality of user devices associated with the user account.

17. The system of claim 16, wherein the plurality of user devices are configured to detect the digital pen, and transmit, to the server, a signal indicating that the digital pen is authorized to interact with the plurality of user devices, wherein the server is configured to receive the signal from the plurality of user devices.

18. The system of claim 16, wherein the server is configured to:

disassociate the device identity from the plurality of user devices; and based on the disassociation, disassociate the device identity from the user account.

19. The system of claim 16, wherein the digital pen is configured to receive a user input, and transmit, to the plurality of user devices and the server, a signal associated with the user input, wherein the plurality of user devices and the server are configured to determine whether the digital pen is to execute an operation associated with the user input.

20. The system of claim 16, further comprising one or more other digital pens associated with the device identity, wherein each of the one or more other digital pens is configured to interact with each of the plurality of user devices in an unlimited manner.

* * * * *